US011036512B2

(12) United States Patent
Perais et al.

(10) Patent No.: US 11,036,512 B2
(45) Date of Patent: Jun. 15, 2021

(54) SYSTEMS AND METHODS FOR PROCESSING INSTRUCTIONS HAVING WIDE IMMEDIATE OPERANDS

(71) Applicant: Microsoft Technology Licensing, LLC, Redmond, WA (US)

(72) Inventors: Arthur Perais, Morrisville, NC (US); Rodney Wayne Smith, Raleigh, NC (US); Shivam Priyadarshi, Morrisville, NC (US); Rami Mohammad Al Sheikh, Morrisville, NC (US); Vignyan Reddy Kothinti Naresh, Morrisville, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/579,161

(22) Filed: Sep. 23, 2019

(65) Prior Publication Data

US 2021/0089308 A1    Mar. 25, 2021

(51) Int. Cl.
*G06F 9/30* (2018.01)
*G06F 9/38* (2018.01)

(52) U.S. Cl.
CPC ...... *G06F 9/30181* (2013.01); *G06F 9/30167* (2013.01); *G06F 9/3802* (2013.01)

(58) Field of Classification Search
None
See application file for complete search history.

(56) References Cited

U.S. PATENT DOCUMENTS

| 5,881,259 | A  | * | 3/1999 | Glass ............... | G06F 7/48 712/210 |
| 6,012,125 | A  | * | 1/2000 | Tran ................ | G06F 9/382 711/125 |
| 6,725,360 | B1 | * | 4/2004 | Aldrich ............ | G06F 7/509 708/518 |
| 7,389,408 | B1 |   | 6/2008 | Nelson et al.    |   |

(Continued)

OTHER PUBLICATIONS

Glokler, et al., "Power Efficient Semi-Automatic Instruction Encoding for Application Specific Instruction Set Processors", In Proceedings of IEEE International Conference on Acoustics, Speech, and Signal Processing, May 7, 2001, pp. 1169-1172.

(Continued)

*Primary Examiner* — Eric Coleman
(74) *Attorney, Agent, or Firm* — Withrow & Terranova, PLLC

(57) ABSTRACT

A processor element in a processor-based system is configured to fetch one or more instructions associated with a program binary, where the one or more instructions include an instruction having an immediate operand. The processor element is configured to determine if the immediate operand is a reference to a wide immediate operand. In response to determining that the immediate operand is a reference to a wide immediate operand, the processor element is configured to retrieve the wide immediate operand from a common intermediate lookup table (CILT) in the program binary, where the immediate operand indexes the wide immediate operand in the CILT. The processor element is then configured to process the instruction having the immediate operand such that the immediate operand is replaced with the wide immediate operand from the CILT.

20 Claims, 9 Drawing Sheets

(56) References Cited

U.S. PATENT DOCUMENTS

| | | | |
|---|---|---|---|
| 7,730,281 B2 | 6/2010 | Kyker et al. | |
| 9,063,749 B2 | 6/2015 | Ceze et al. | |
| 9,207,880 B2 | 12/2015 | Lee | |
| 10,261,791 B2 | 4/2019 | Prasky et al. | |
| 2009/0182992 A1* | 7/2009 | Greiner | G06F 9/30163 |
| | | | 712/225 |
| 2010/0169621 A1* | 7/2010 | Takao | G06F 11/2236 |
| | | | 712/227 |
| 2010/0312991 A1 | 12/2010 | Norden et al. | |
| 2012/0151189 A1* | 6/2012 | Kruecken | G06F 9/30112 |
| | | | 712/220 |
| 2017/0286110 A1* | 10/2017 | Agron | G06F 9/3017 |

OTHER PUBLICATIONS

"International Search Report and Written Opinion Issued in PCT Application No. PCT/US20/038570", dated Sep. 29, 2020, 14 Pages.

Wilcox, et al., "Tool support for software lookup table optimization", In Journal of Scientific Programming, vol. 19, Issue 4, Dec. 5, 2011, 36 Pages.

* cited by examiner

SYSTEMS AND METHODS FOR PROCESSING INSTRUCTIONS HAVING WIDE IMMEDIATE OPERANDS

FIELD OF THE DISCLOSURE

The present disclosure is related to processor-based systems and methods for operating processor-based systems to accommodate the use of immediate operands that are larger than an instruction size defined by an instruction set architecture (ISA) with minimal overhead.

BACKGROUND

Instruction set architectures (ISAs) define the instructions that can be executed by a processor. Most ISAs have a relatively small instruction size (e.g., four bytes). In some cases, it is desired to use an immediate value (i.e., a value that is stored as part of an instruction itself rather than as a pointer to a memory location or register) that is larger than the instruction size defined by the ISA. For example, in an ISA having a four byte instruction length, for a move immediate instruction (e.g., "movi register, immediate," where "movi" is the opcode of the instruction, "immediate" is an immediate operand specifying an immediate value, and "register" is a register operand specifying the register that will be updated with the immediate value), one byte is reserved for the opcode and one byte is reserved for the register operand, leaving only two bytes for the immediate operand. In this example, immediate values with a length over two bytes in length cannot be stored in the instruction itself. As another example, in the same ISA having a four byte instruction length, for a branch to immediate offset instruction (e.g., "bri immediate," where "bri" is the opcode of the instruction and "immediate" is an immediate operand specifying the offset value to jump to) one byte is reserved for the opcode, leaving only three bytes for the immediate operand. In this example, immediate values with a length over three bytes cannot be stored in the instruction itself. Where an immediate value is too large to be stored in an instruction because it is too large to fit in the allotted space provided by the instruction as dictated by the ISA, it is defined herein as a wide immediate.

Instructions including wide immediate operands are conventionally handled by software. For example, in one approach for move immediate instructions having wide immediate operands, the wide immediate operands are embedded in a program binary and the instruction with the wide immediate operand is replaced with a load instruction. Accordingly, a move immediate instruction as follows:

movi r0, 0xBADDFOODDEADCAFE may be altered such that the wide immediate operand is stored in the program binary (at memory location 0xF9 when the binary is loaded into memory in the present example) and the move immediate instruction becomes:

ldr r0, [0xF9]

This can be done either explicitly by a developer of the program or by a compiler at compile time. Notably, any instructions that are dependent on the move immediate instruction must wait for the wide immediate operand to be loaded from memory before they can be processed. This may take several processing cycles and thus increase the execution time of a program binary.

In another approach for move immediate instructions having wide immediate operands, the instructions are replaced with a sequence of instructions including shift left instructions (shl) and add immediate instructions (addi). Accordingly, the same move immediate instruction as above:

movi r0, 0xBADDFOODDEADCAFE may be altered to become:

movi r0, 0xBADDFOOD
shl r0, 32
addi r0, 0xDEADCAFE

Again, this can be done either explicitly by a developer of the program or by a compiler at compile time.

As another example, in one approach for branch to immediate offset instructions having a wide immediate operand, multiple branches, each having immediate operands that fit within the instruction length of the ISA, may be chained together to finally arrive at the offset indicated by the wide immediate operand. Such an approach causes multiple control flow redirections and thus consumes additional processor resources. In another approach for branch to immediate offset instructions having a wide immediate operand, an indirect branch may be used to arrive at the offset indicated by the wide immediate operand. Indirect branches occupy space in branch prediction circuitry of the processor, and in the present case in which there is one target that is 100% predictable, occupying this space in the branch prediction circuitry is wasteful.

In all of the examples discussed above, there is a relatively large overhead incurred for processing instructions having wide immediate operands such that the performance of binary execution is reduced. Accordingly, there is a need for improved systems and methods for processing instructions having wide immediate operands.

SUMMARY

Exemplary aspects of the present disclosure are related to improved systems and methods for processing instructions having wide immediate values. In this regard, in one exemplary aspect, a processor element in a processor-based system is configured to fetch one or more instructions associated with a program binary, where the one or more instructions include an instruction having an immediate operand. The processor element is configured to determine if the immediate operand is a reference to a wide immediate operand. In response to determining that the immediate operand is a reference to a wide immediate operand, the processor element is configured to retrieve the wide immediate operand from a common immediate lookup table (CILT) in the program binary, where the immediate operand indexes the wide immediate operand in the CILT. The processor element is then configured to process the instruction having the immediate operand such that the immediate operand is replaced with the wide immediate operand from the CILT. By allowing instructions with immediate operands to reference a wide immediate operand in the CILT, instructions having wide immediate values can be expressed in the program binary as a single instruction having dual semantics. This may lower the static size of the program binary as well as improve instruction fetch bandwidth compared to conventional approaches, which may improve the performance of the processor-based system.

In another exemplary aspect, a processor element in a processor-based system includes a hardware CILT (HCILT) and instruction processing circuitry. The HCILT includes hardware storage (e.g., a memory or register) configured to store a table indexing immediate values to wide immediate values. The instruction processing circuitry is configured to fetch one or more instructions associated with a program binary from an instruction memory, the instructions including an instruction having an immediate operand. The instruction processing circuitry is configured to determine if the immediate operand is a reference to a wide immediate operand. In response to determining that the immediate operand is a reference to a wide immediate operand, the instruction processing circuitry is configured to search the HCILT for the wide immediate operand indexed by the immediate operand, and, in response to finding the wide immediate operand in the HCILT, process the instruction such that the immediate operand is replaced by the wide immediate operand from the HCILT. If the wide immediate operand is not found in the HCILT, it is retrieved from the CILT as discussed above. If the immediate operand is not a reference to a wide immediate operand, the instruction is processed as usual. Using the HCILT to store and retrieve wide immediate operands avoids having to load the wide immediate operands from memory and thus may significantly improve the performance of the processor-based system.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Exemplary aspects of the present disclosure are related to improved systems and methods for processing instructions having wide immediate values. In this regard, in one exemplary aspect, a processor element in a processor-based system is configured to fetch one or more instructions associated with a program binary, where the one or more instructions include an instruction having an immediate operand. The processor element is configured to determine if the immediate operand is a reference to a wide immediate operand. In response to determining that the immediate operand is a reference to a wide immediate operand, the processor element is configured to retrieve the wide immediate operand from a common immediate lookup table (CILT) in the program binary, where the immediate operand indexes the wide immediate operand in the CILT. The processor element is then configured to process the instruction having the immediate operand such that the immediate operand is replaced with the wide immediate operand from the CILT. By allowing instructions with immediate operands to reference a wide immediate operand in the CILT, instructions having wide immediate values can be expressed in the program binary as a single instruction having dual semantics. This may lower the static size of the program binary as well as improve instruction fetch bandwidth compared to conventional approaches, which may improve the performance of the processor-based system.

In another exemplary aspect, a processor element in a processor-based system includes a hardware CILT (HCILT) and instruction processing circuitry. The HCILT includes hardware storage (e.g., a memory or register) configured to store a table indexing immediate values to wide immediate values. The instruction processing circuitry is configured to fetch one or more instructions associated with a program binary from an instruction memory, the instructions including an instruction having an immediate operand. The instruction processing circuitry is configured to determine if the immediate operand is a reference to a wide immediate operand. In response to determining that the immediate operand is a reference to a wide immediate operand, the instruction processing circuitry is configured to search the HCILT for the wide immediate operand indexed by the immediate operand, and, in response to finding the wide immediate operand in the HCILT, process the instruction such that the immediate operand is replaced by the wide immediate operand from the HCILT. If the wide immediate operand is not found in the HCILT, it is retrieved from the CILT as discussed above. If the immediate operand is not a reference to a wide immediate operand, the instruction is processed as usual. Using the HCILT to store and retrieve wide immediate operands avoids having to load wide immediate operands from memory and thus may significantly improve the performance of the processor-based system.

Figure 1:
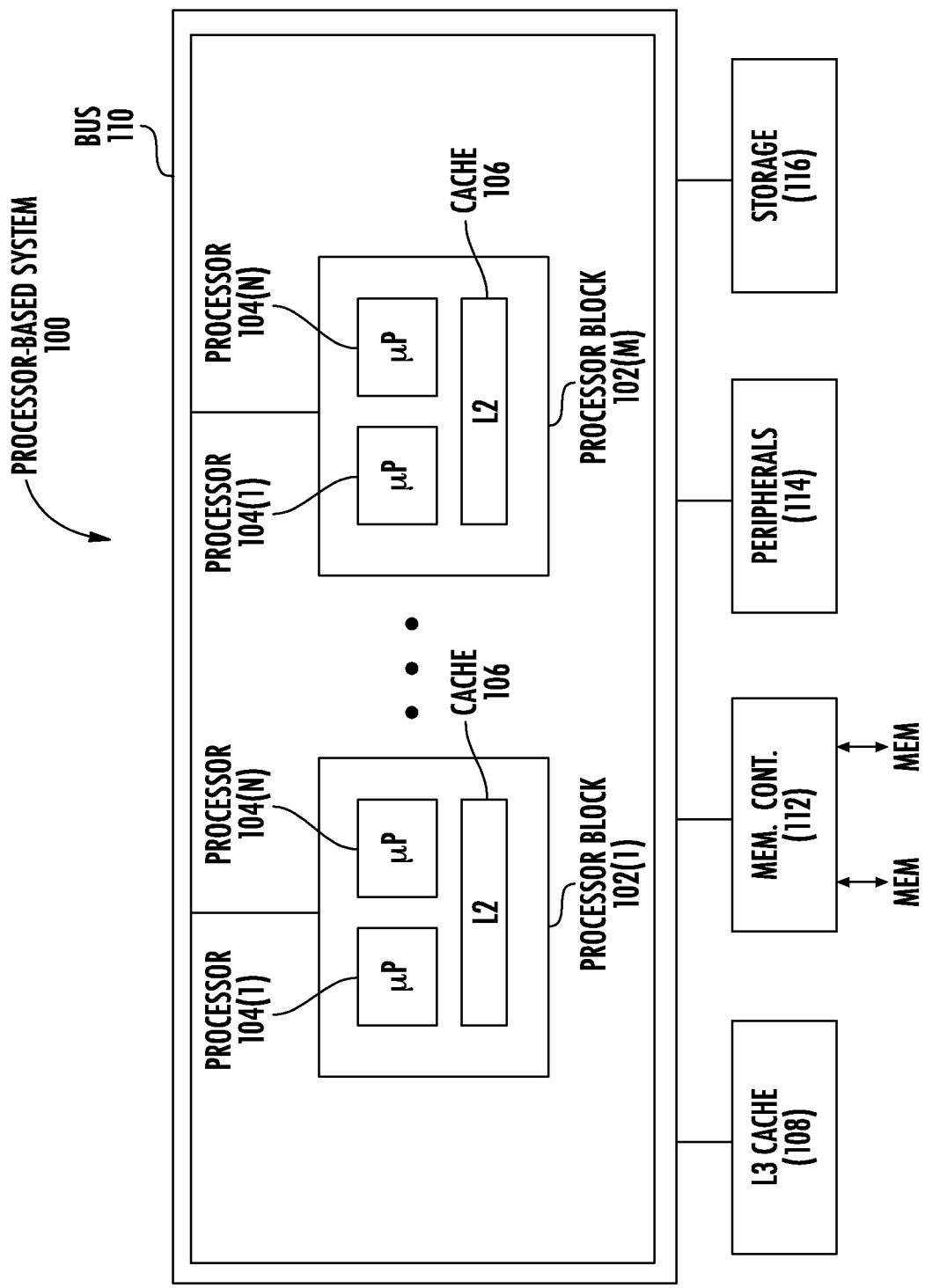
FIG. 1 is a block diagram illustrating an exemplary processor-based system that includes a processor configured to process instructions including wide immediate operands such that the wide immediate operands are fetched from a common immediate lookup table (CILT) or hardware CILT (HCILT)

FIG. 1 is a schematic diagram of an exemplary processor-based system 100 that may include improvements thereto in order to more efficiently process instructions having wide immediate operands. The processor-based system 100 includes a number of processor blocks 102(1)-102(M), wherein in the present exemplary embodiment "M" is equal to any number of processor blocks 102 desired. Each processor block 102 contains a number of processor elements 104(1)-104(N), wherein in the present exemplary embodiment "N" is equal to any number of processors desired. The processor elements 104 in each one of the processor blocks 102 may be microprocessors (μP), vector processors (vP), or any other type of processor. Further, each processor block 102 contains a shared level 2 (L2) cache 106 for storing cached data that is used by any of, or shared among, each of the processor elements 104. A shared level 3 (L3) cache 108 is also provided for storing cached data that is used by any of, or shared among, each of the processor blocks 102. An internal bus system 110 is provided that allows each of the processor blocks 102 to access the shared L3 cache 108 as well as other shared resources such as a memory controller 112 for accessing a main, external memory (MEM), one or more peripherals 114 (including input/output devices, networking devices, and the like), and storage 116.

In operation, one or more of the processor elements 104 in one or more of the processor blocks 102 work with the memory controller 112 to fetch instructions from memory, execute the instructions to perform one or more operations and generate a result, and optionally store the result back to memory or provide the result to another consumer instruction for consumption.

Figure 2:
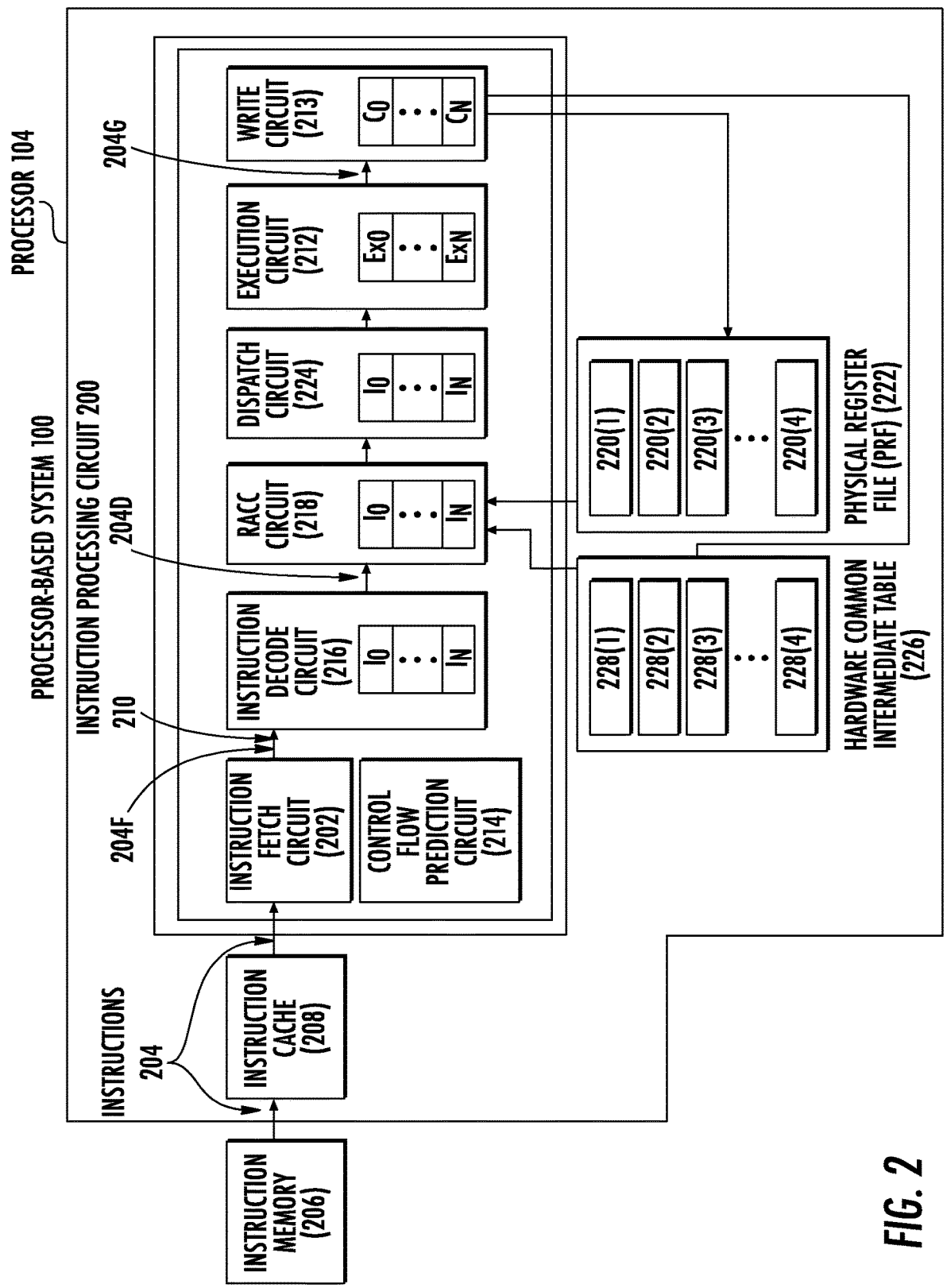
FIG. 2 is a block diagram illustrating exemplary details of a processor in a processor-based system in FIG. 1 processing instructions including wide immediate operands such that the wide immediate operands are fetched from a CILT or HCILT.

FIG. 2 shows details of a processor element 104 in a processor block 102 of the processor-based system 100 according to an exemplary embodiment of the present disclosure. The processor element 104 includes an instruction processing circuit 200. The instruction processing circuit 200 includes an instruction fetch circuit 202 that is configured to fetch instructions 204 from an instruction memory 206. The instruction memory 206 may be provided in or as part of a system memory in the processor-based system 100 as an example. An instruction cache 208 may also be provided in the processor element 104 to cache the instructions 204 fetched from the instruction memory 206 to reduce latency in the instruction fetch circuit 202. The instruction fetch circuit 202 in this example is configured to provide the instructions 204 as fetched instructions 204F into one or more instruction pipelines $I_0$-$I_N$ as an instruction stream 210 in the instruction processing circuit 200 to be pre-processed, before the fetched instructions 204F reach an execution circuit 212 to be executed. The instruction pipelines $I_0$-$I_N$ are provided across different processing circuits or stages of the instruction processing circuit 200 to pre-process and process the fetched instructions 204F in a series of steps that can be performed concurrently to increase throughput prior to execution of the fetched instructions 204F in the execution circuit 212.

A control flow prediction circuit 214 (e.g., a branch prediction circuit) is also provided in the instruction processing circuit 200 in the processor element 104 to speculate or predict a target address for a control flow fetched instruction 204F, such as a conditional branch instruction. The prediction of the target address by the control flow prediction circuit 214 is used by the instruction fetch circuit 202 to determine the next fetched instructions 204F to fetch based on the predicted target address. The instruction processing circuit 200 also includes an instruction decode circuit 216 configured to decode the fetched instructions 204F fetched by the instruction fetch circuit 202 into decoded instructions 204D to determine the instruction type and actions required, which may also be used to determine in which instruction pipeline $I_0$-$I_N$ the decoded instructions 204D should be placed. The decoded instructions 204D are then placed in one or more of the instruction pipelines $I_0$-$I_N$ and are next provided to a register access circuit 218.

The register access circuit 218 is configured to access a physical register 220(1)-220(X) in a physical register file (PRF) 222 to retrieve a produced value from an executed instruction 204E from the execution circuit 212. The register access circuit 218 is also configured to provide the retrieved produced value from an executed instruction 204E as the source register operand of a decoded instruction 204D to be executed. The instruction processing circuit 200 also includes a dispatch circuit 224, which is configured to dispatch a decoded instruction 204D to the execution circuit 212 to be executed when all source register operands for the decoded instruction 204D are available. For example, the dispatch circuit 224 is responsible for making sure that the necessary values for operands of a decoded consumer instruction 204D, which is an instruction that consumes a produced value from a previously executed producer instruction, are available before dispatching the decoded consumer instruction 204D to the execution circuit 212 for execution. The operands of the decoded instruction 204D can include intermediate values, values stored in memory, and produced values from other decoded instructions 204D that would be considered producer instructions to the consumer instruction.

Notably, an HCILT 226 is provided within, or as shown, in addition to the PRF 222. In the present example, the HCILT 226 includes a set of HCILT registers 228(1)-228(Y), where "Y" is any desired number, dedicated to storing wide immediate values such that the wide immediate values are indexed by immediate values that fit within the instruction size of the ISA of the processor element 104. The HCILT registers 228 may include support registers for accomplishing the functionality of the HCILT 226 as discussed in detail below. When instructions having immediate operands that reference wide immediate operands (as dictated by the opcode or the semantics of the immediate operand as discussed below), the HCILT 226 may be searched for the wide immediate operand such that the immediate operand is replaced with the wide immediate operand from the HCILT 226 by the register access circuitry 218. This may significantly improve the performance of program binary execution by bypassing loading wide immediate operands from memory, which would otherwise need to occur to process an instruction having a wide immediate value. Further details regarding the functionality of the HCILT 226 are discussed below. Notably, while the HCILT 226 is illustrated above as a set of registers, the HCILT may be implemented as any type of dedicated hardware storage such as a hardware memory in various embodiments.

The execution circuit 212 is configured to execute decoded instructions 204D received from the dispatch circuit 224. As discussed above, the executed instructions 204E may generate produced values to be consumed by other instructions. In such a case, a write circuit 230 writes the produced values to the PRF 222 so that they can be later consumed by consumer instructions.

Figure 3:
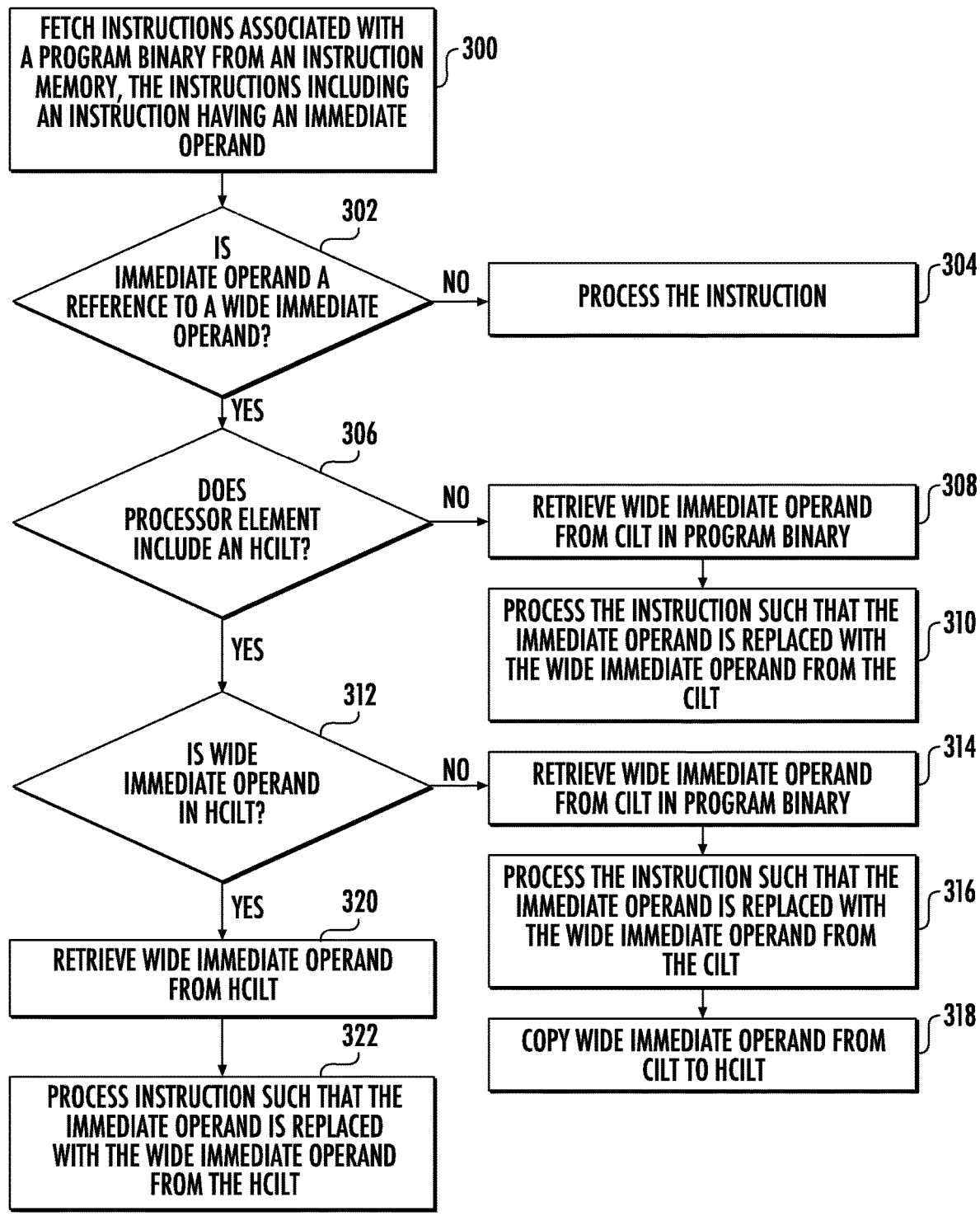
FIG. 3 is a flowchart illustrating an exemplary process for processing instructions that may include immediate operands that reference wide immediate operands stored in a CILT or HCILT.

FIG. 3 is a flow diagram illustrating a method for operating the processor element 104 to process instructions having wide immediate operands according to an exemplary embodiment of the present disclosure. First, instructions associated with a program binary are fetched from the instruction memory 206, or, if cached, the instruction cache 208 (block 300). Notably, as discussed in detail below, the program binary includes a CILT, which is a table storing wide immediate operands that are indexed by immediate operands that fit within an instruction size of the ISA of the processor element 104. The instructions include an instruction having an immediate operand. As discussed above, an immediate operand is a value that is stored as part of an instruction itself, rather than as a point to a memory location or register. A determination is made whether the immediate operand is a reference to a wide immediate operand (block 302). Determining whether the immediate operand is a reference to a wide immediate operand may be accomplished in several ways. In one exemplary embodiment, the ISA of the processor element 104 may specify that immediate operands include a reserved bit, which specifies whether the immediate operand is a reference to a wide immediate operand or not. For example, if the most significant bit of an immediate operand is set, the ISA may specify that the immediate operand is a reference to a wide immediate operand, which may be stored in a CILT or HCILT as discussed below. If the most significant bit of the immediate operand is not set, the ISA may specify that the immediate operand is not a reference to a wide immediate operand. In another exemplary embodiment, the ISA of the processor element 104 may specify custom opcodes that specify that an immediate operand following the custom opcode is a reference to a wide immediate operand.

If the immediate operand is not a reference to a wide immediate operand, the instruction is processed by the execution circuit 212 conventionally (block 304). If the immediate operand is a reference to a wide immediate operand, a determination is made whether the processor element 104 includes the HCILT 226 (block 306). As discussed above, the HCILT 226 is a hardware structure including one or more registers for storing a table which stores wide immediate operands referenced by immediate operands that fit within an instruction size of the ISA of the processor element 104. The HCILT 226 is the hardware corollary to the CILT, and is meant to further expedite processing of instructions having wide immediate operands compared to the CILT alone. Determining if the processor element 104 includes the HCILT 226 may comprise reading a register of the processor element 104. Instructions for determining whether the processor element 104 includes the HCILT 226 may be included in the ISA of the processor element 104. If the processor element 104 does not include the HCILT 226, the wide immediate operand may be retrieved from the CILT in the program binary (block 308). Retrieving the wide immediate operand from the CILT in the program binary may include fetching the wide immediate operand from a memory location that is indexed by the immediate value. The immediate operand may directly point to a memory location including the wide immediate value (e.g., via an offset value from a starting memory address of the CILT) or the CILT may be a map, where the immediate value is hashed to get the actual index of the wide immediate value. Notably, either way the loading of the wide immediate value from memory is performed by the processor element 104 in response to encountering an instruction with an immediate operand that references a wide immediate operand (either due to dual semantics of the immediate operand or due to a custom opcode) such that the load from memory is not explicit in instructions associated with the program binary. The difference is expressed below with pseudocode, where an add operation according to conventional approaches would be expressed as:

$A$=load $X$//$X$ is $a$ wide immediate operand $B$=$Y$+$A$//dependent $on$ preceding load instruction can be reconfigured as:

$B$=$Y$+$A'$//$A'$ is an immediate operand with dual semantics

As shown, two instructions used to process an instruction having a wide immediate operand can be condensed into a single instruction, where the loading of the wide immediate value is handled by the processor according to a dedicated ISA specification. This not only reduces the static code size of the program binary but also the instruction fetch bandwidth, which is likely to improve the performance of the processor element 104.

The instruction is then processed such that the immediate operand is replaced with the wide immediate operand from the CILT (block 310). If the processor element 104 does include the HCILT 226, a determination is made whether the wide immediate operand referenced by the immediate operand is in the HCILT 226 (block 312). The HCILT 226 may not be large enough to hold every wide immediate operand in the program binary. That is the, HCILT 226 may be smaller than the CILT and thus only some of the wide immediate operands may be present in the HCILT 226. If the wide immediate operand referenced by the immediate operand is not in the HCILT 226, the wide immediate operand is retrieved from the CILT in the program binary (block 314), which is done as discussed above by a dynamic load initiated by the processor element 104. The instruction is then processed such that the immediate operand is replaced with the wide immediate operand from the CILT (block 316). Optionally, the wide immediate operand can also be copied from the CILT to the HCILT 226 (block 318) such that the wide immediate operand can be more easily accessed in a future processing cycle. One or more caching rules may dictate whether a wide immediate operand not found in the HCILT 226 should be added to the HCILT 226 after it is fetched from the CILT as discussed below.

If the wide immediate operand is found in the HCILT 226, the wide immediate operand is retrieved from the HCILT 226 (block 320). The wide immediate operand may be retrieved from the HCILT 226 using the immediate operand as a direct index or a hashed index as discussed above with respect to the CILT. The instruction is then processed such that the immediate operand is replaced with the wide immediate operand from the HCILT 226 (block 322).

To support the foregoing operations, a number of system registers may be added to the processor element 104, providing support for using the CILT alone or the CILT along with an HCILT. The table below indicates the additional registers and their functions:

| Register Name | Function |
| --- | --- |
| HCILT_present | Indicates if the hardware implements an HCILT. If this bit is not set, the OS must not attempt to load the CILT into the HCILT. Read only register. |
| CILT_base_address | Contains the virtual address at which the CILT is loaded in the program's address space. |
| HCILT_active_entry | Contains the current active HCILT entry, which is the entry in the HCILT table that is implicitly written/read when accessing the HCILT through a system register read/write. |
| HCILT_table | A system register such that the instruction write system register (wsr) HCILT_table, constant will write CILT_base_address[immediate operand * size of CILT entry in bytes] into the HCILT array entry number pointed to by HCILT_active_entry. The register can also be read to retrieve stored wide immediate operands therein. |

Notably, these registers are only one exemplary implementation of ISA support for a CILT and HCILT for improving processing of instructions having wide immediate operands. In one or more alternative embodiments, dedicated instructions in the ISA are provided to load wide immediates from the CILT such that one or more of the registers discussed above may be unnecessary and thus not included.

Figure 4:
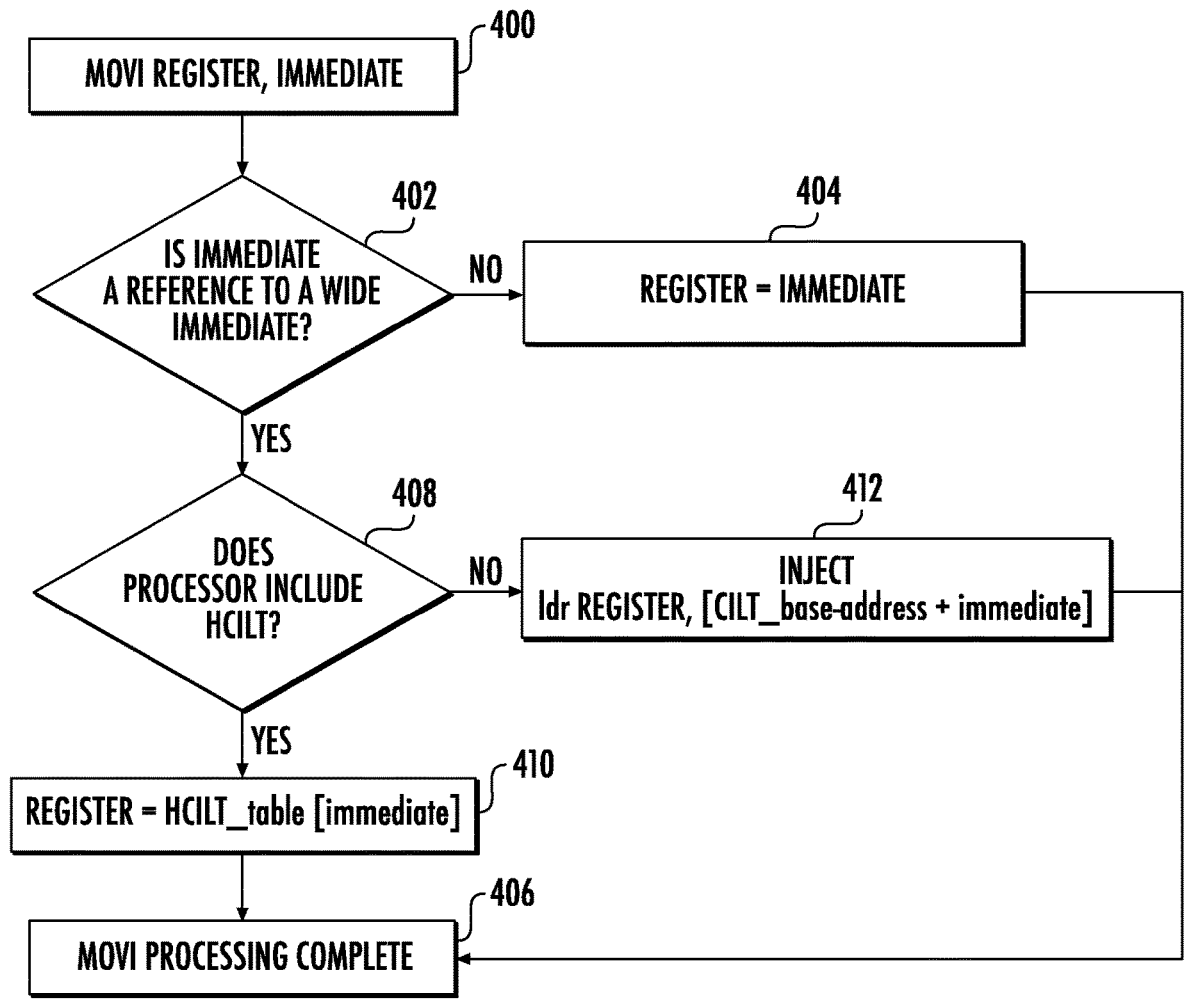
FIG. 4 is a flowchart illustrating an exemplary process for processing a move immediate instruction that may include an immediate operand that references a wide immediate operand stored in a CILT or HCILT.

FIG. 4 is a flow diagram illustrating the application of the process discussed above to a specific instruction, a move immediate (movi) instruction to be processed by the processor element 104. A move immediate instruction includes a register operand and an immediate operand (block 400). The instruction, when processed, moves the immediate operand into the register. The processor element 104 determines if the immediate operand is a reference to a wide immediate operand (block 402). As discussed above, determining whether the immediate operand is a reference to a wide immediate operand may include determining if a reserved bit in the immediate operand is set. If the immediate operand is not a reference to a wide immediate operand, the register is set to the immediate operand (block 404) and the move immediate instruction is completed (block 406). If the immediate operand is a reference to a wide immediate operand, the processor element 104 determines if it includes the HCILT 226 (block 408). If the processor element 104 includes the HCILT 226, the register is set to the value in HCILT_table[immediate] (block 410). As shown, the immediate operand indexes the wide immediate operand in the HCILT 226. The move immediate instruction is then completed (block 406). If the processor element 104 does not include the HCILT 226, the processor element 104 injects a load register instruction ("ldr register, [CILT_base_address+immediate]") to load the wide immediate operand from the CILT (block 412), which is stored in memory starting at CILT_base_address. Again, the immediate operand is used to index the wide immediate operand in the CILT. Any reserved bits used for determining if the immediate operand is a reference to a wide immediate operand may be stripped from the immediate value before using the immediate value as an index (e.g., offset) to retrieve the wide immediate operand. The move immediate instruction is then completed (block 406).

Figure 5:
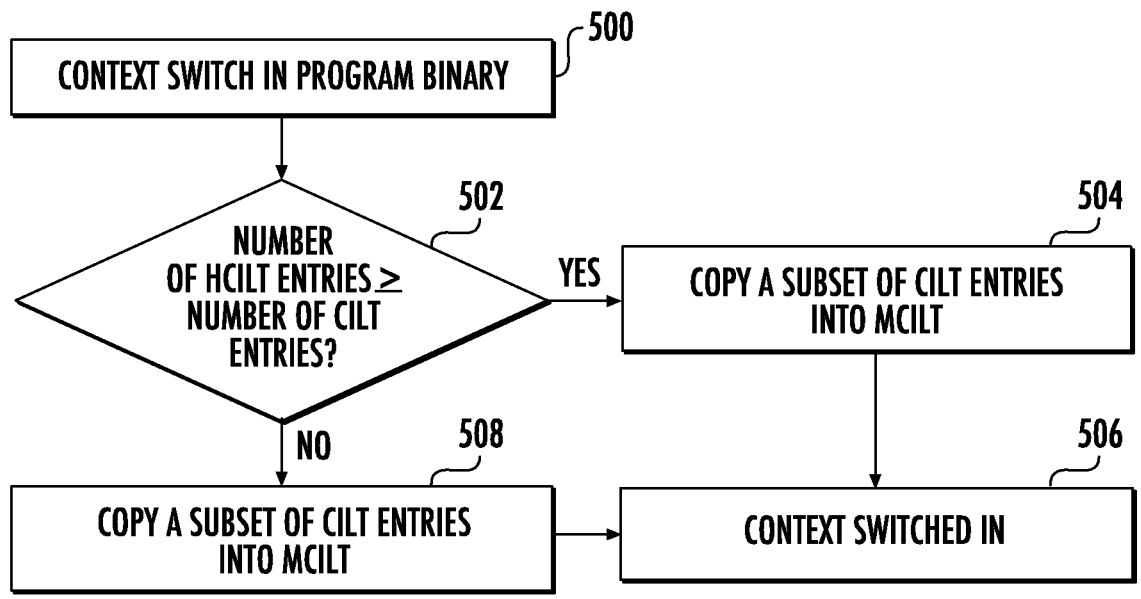
FIG. 5 is a flowchart illustrating an exemplary process for populating an HCILT from a CILT.

FIG. 5 is a flow diagram illustrating how the HCILT 226 in the processor element 104 is populated from the CILT during a context switch according to an exemplary embodiment of the present disclosure. The population of the HCILT 226 occurs in response to a context switch in the program binary (block 500). The processor element 104 determines whether a number of entries in the HCILT 226 is greater than or equal to a number of entries in the CILT (block 502). As discussed above, the HCILT 226 includes a number of registers. The size of the registers determines how many entries (where each entry stores a wide immediate operand) can be stored in the HCILT 226 and thus how many entries there are. As discussed above, the number of entries in the HCILT 226 may be provided in a register, HCILT entries, in which case determining if the number of entries in the HCILT 226 is greater than or equal to the number of entries in the CILT may be a matter of simply reading a register and performing a comparison. If the number of entries in the HCILT 226 is greater than or equal to the number of entries in the CILT, all of the CILT entries are copied into the HCILT (block 504). For example, for a CILT having 32 entries and an HCILT 226 having 32 or more entries, the following exemplary instructions may be executed to populate the HCILT 226 from the CILT:

wsr HCILT_active_entry, 0
wsr HCILT_table wide_immediate_0
wsr HCILT_active_entry, 1
wsr HCILT_table wide_immediate_1
wsr HCILT_active_entry, 2
wsr HCILT_table wide_immediate_2
. . .
wsr HCILT_active_entry, 31
wsr HCILT_Table wide_immediate_31 where "wsr register, immediate" is a write system register instruction that writes "immediate" to "register," "wide_immediate_x" is wide immediate operand "x" stored in the CILT. As shown, HCILT_active_entry is written to update the index of the HCILT_table before every write to the HCILT_table. However, in some embodiments the handling of the HCILT_table index may be opaque such that it is automatically incremented and decremented (e.g., similar to a stack). The context is then switched in (block 506).

If the number of entries in the HCILT 226 is less than the number of entries in the CILT, only a subset of the CILT entries are copied into the HCILT 226 (block 508). For example, for a CILT having 32 entries and an HCILT having 4 entries, the following exemplary instructions may be executed to populate the HCILT 226 from the CILT:

wsr HCILT_active_entry, 0
wsr HCILT_table wide_immediate_0
wsr HCILT_active_entry, 1
wsr HCILT_table wide_immediate_4
wsr HCILT_active_entry, 2
wsr HCILT_table wide_immediate_12
wsr HCILT_active_entry, 3
wsr HCILT_table wide_immediate_29 such that entries 0, 4, 12, and 29 of the CILT are copied into the HCILT 226. The context is then switched in (block 506). Any number of different policies can be provided to determine which entries from the CILT are copied into the HCILT 226 when the number of entries in the HCILT 226 is not sufficient to store all of the entries in the CILT. Further, a caching policy can be implemented as discussed above such that when a wide_immediate operand is not found in the HCILT 226 (i.e., an HCILT 226 miss) and the wide_immediate operand must be fetched from the CILT, the wide_immediate operand is copied into the HCILT 226 at that time.

Figure 6:
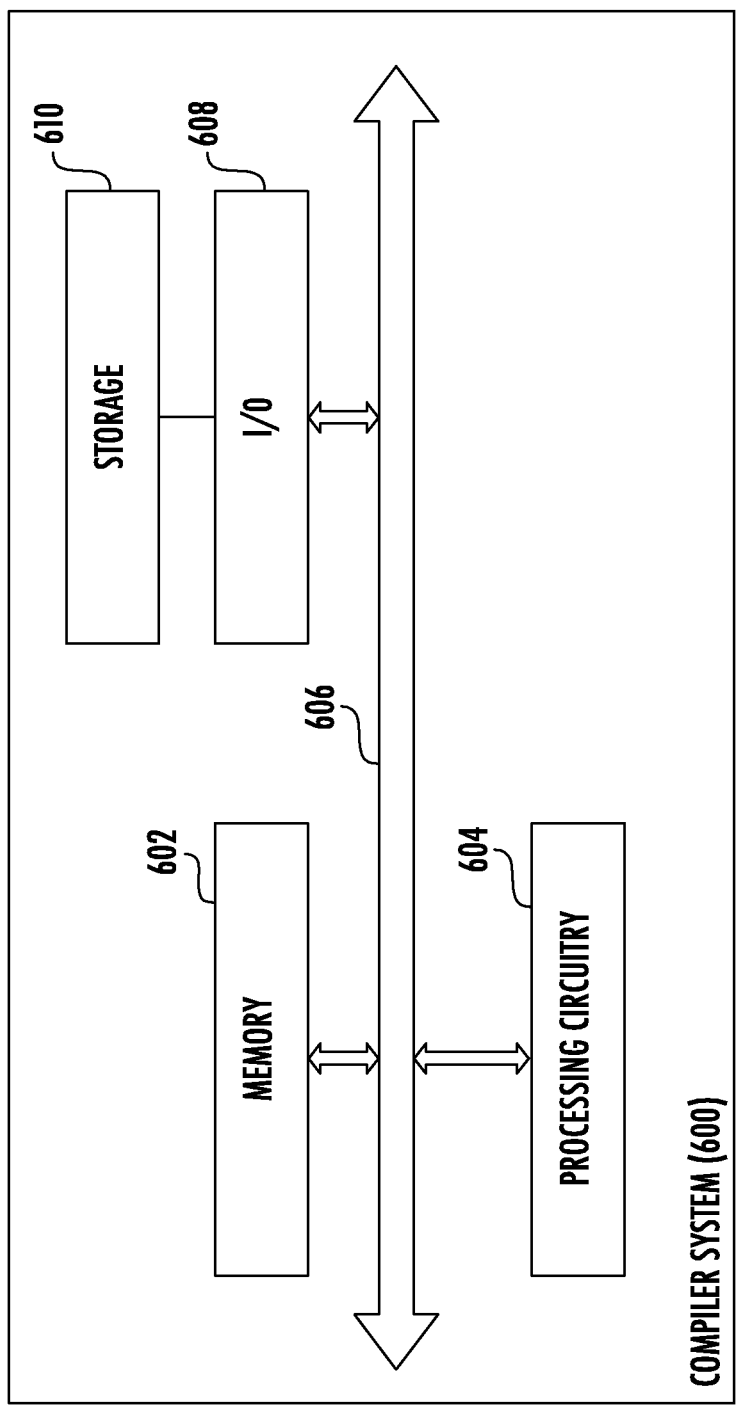
FIG. 6 is a block diagram illustrating an exemplary compiler system for compiling source code into a program binary including a CILT.

The instructions associated with the program binary that are fetched, decoded, and executed by the processor element 104 as discussed above are generated by a compiler such that they include the CILT. FIG. 6 illustrates an exemplary compiler system 600. The compiler system 600 includes a memory 602 and processing circuitry 604. The memory 602 and the processing circuitry 604 are connected via a bus 606. As discussed below, the memory 602 stores instructions, which, when executed by the processing circuitry 604 cause the compiler system 600 to retrieve or otherwise receive source code, generate an intermediate representation of the source code, apply one or more compiler optimizations to the intermediate representation of the source code, and provide the optimized intermediate representation of the source code as machine code suitable for execution by a processor in a processor-based system. The compiler system 600 may further include input/output circuitry 608, which may connect to storage 610 for storage and retrieval of source code and/or machine code. For purposes of discussion, the operation of the compiler system 600 will be described as it relates to compiling source code into machine code for the processor element 104 in the processor-based system 100. However, the compiler system 600 may more generally compile source code into machine code suitable for any processor in any processor-based system, including several different processors for several different processor-based systems. According to various embodiments of the present disclosure, the memory 602 may include instructions, which, when executed by the processing circuitry 604 cause the compiler system 600 to generate machine code including a CILT and one or more instructions having an immediate value that references a wide_immediate value stored in the CILT as discussed in detail below.

Figure 7:
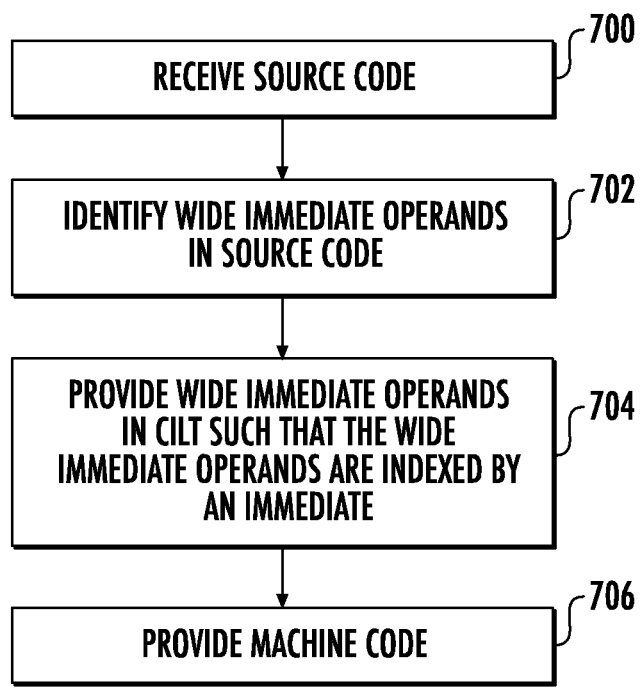
FIG. 7 is a flowchart illustrating an exemplary process for generating a program binary including a CILT from source code.

FIG. 7 is a flow diagram illustrating a method for operating the compiler system 600 to generate a program binary including a CILT according to an exemplary embodiment of the present disclosure. First, the compiler system 600 receives source code (block 700). The source code may be code written in a high-level programming language such as C, Rust, Go, Swift, and the like. Alternatively, the source code may be in a low-level language (i.e., written directly in machine code) that is only assembled by the compiler system 600 as discussed below. The compiler system 600 identifies wide_immediate operands in the source code (block 702). The wide immediate operands may be identified by static code analysis according to one or more rules. For example, wide_immediate operands may be identified based on their length, but may also be required to meet additional requirements such as being present in the source code a certain number of times. The compiler system 600 may identify the wide_immediate operands after converting the source code to an intermediate representation suitable for analysis. The compiler system 600 provides the identified wide_immediate values in a CILT (block 704), which as discussed above is a data structure, specifically a table, indexing wide_immediate operands to immediate values that fit within an instruction length of the ISA of the processor element 104. The compiler system 600 may perform one or more additional steps such as code optimization and the like before providing machine code based on the source code (block 706). As discussed above, the CILT data structure, along with the updated ISA for the processor element 104 which allows for immediate operands to reference wide immediate operands stored in the CILT, and, optionally, the HCILT 226, may improve the performance of binary execution.

Figure 8:
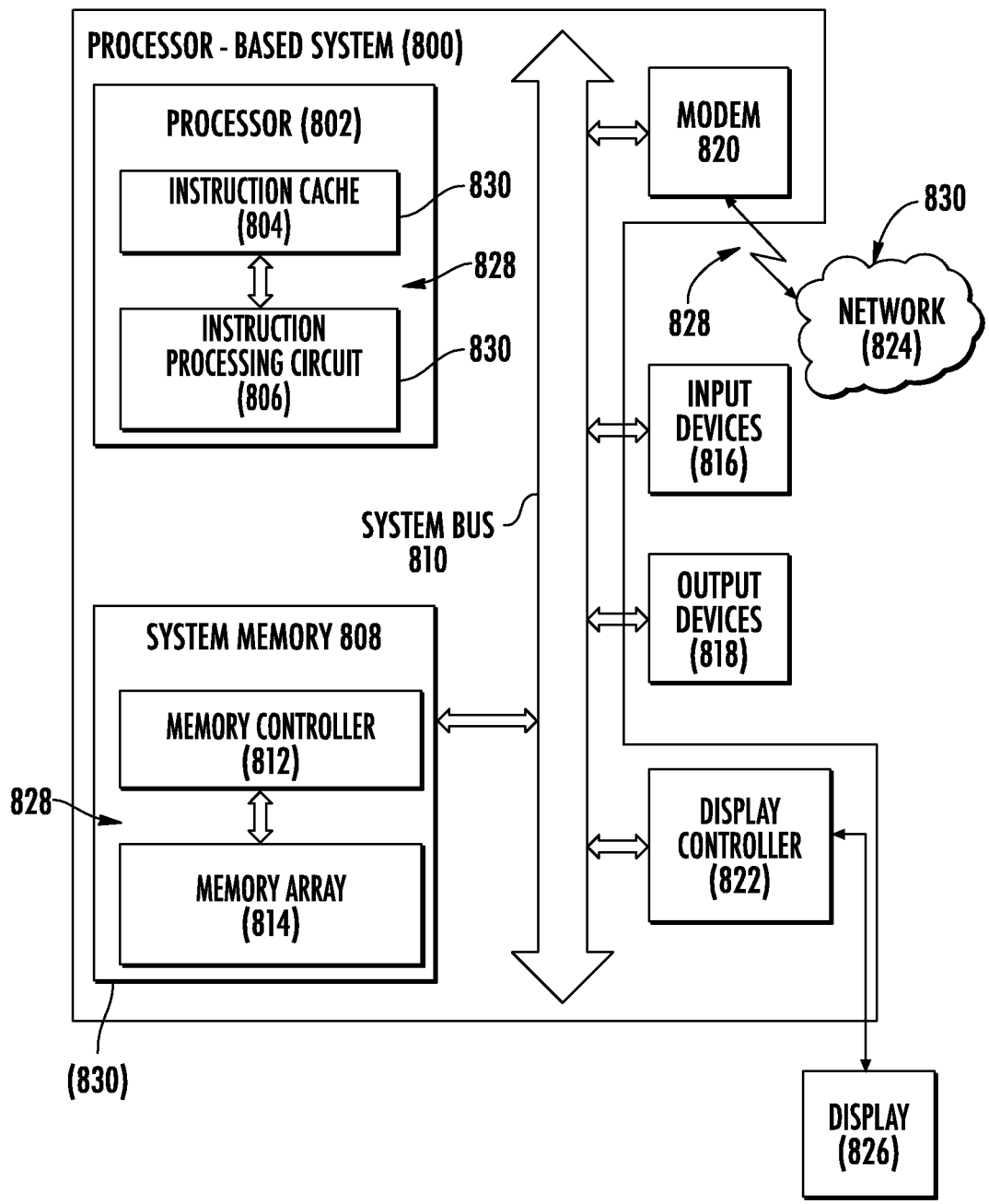
FIG. 8 is a block diagram illustrating an exemplary processor-based system that includes a processor configured to process instructions including wide immediate operands such that the wide immediate operands are fetched form a CILT or HCILT.

FIG. 8 is a block diagram of an exemplary processor-based system 800 that includes a processor 802 configured to support execution of compiler-optimized machine code based on runtime information about the processor 802. For example, the processor 802 in FIG. 10 could be the processor element 104 in FIG. 2, and the processor-based system 800 may be the same as the processor-based system 100 in FIG. 1 with further and/or alternative details shown. The processor-based system 800 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer. In this example, the processor-based system 800 includes the processor 802. The processor 802 represents one or more general-purpose processing circuits, such as a microprocessor, central processing unit, or the like. More particularly, the processor 802 may be an EDGE instruction set microprocessor, or other processor implementing an instruction set that supports explicit consumer naming for communicating produced values resulting from execution of producer instructions. The processor 802 is configured to execute processing logic in instructions for performing the operations and steps discussed herein. In this example, the processor 802 includes an instruction cache 804 for temporary, fast access memory storage of instructions and an instruction processing circuit 806. Fetched or prefetched instructions from a memory, such as from a system memory 808 over a system bus 810, are stored in the instruction cache 804. The instruction processing circuit 806 is configured to process instructions fetched into the instruction cache 804 and process the instructions for execution.

The processor 802 and the system memory 808 are coupled to the system bus 810 and can intercouple peripheral devices included in the processor-based system 800. As is well known, the processor 802 communicates with these other devices by exchanging address, control, and data information over the system bus 810. For example, the processor 802 can communicate bus transaction requests to a memory controller 812 in the system memory 808 as an example of a slave device. Although not illustrated in FIG. 8, multiple system buses 810 could be provided, wherein each system bus 810 constitutes a different fabric. In this example, the memory controller 812 is configured to provide memory access requests to a memory array 814 in the system memory 808. The memory array 814 is comprised of an array of storage bit cells for storing data. The system memory 808 may be a read-only memory (ROM), flash memory, dynamic random-access memory (DRAM), such as synchronous DRAM (SDRAM), etc., and a static memory (e.g., flash memory, static random access memory (SRAM), etc.), as non-limiting examples.

Other devices can be connected to the system bus 810. As illustrated in FIG. 8, these devices can include the system memory 808, one or more input device(s) 816, one or more output device(s) 818, a modem 820, and one or more display controllers 822, as examples. The input device(s) 816 can include any type of input device, including but not limited to input keys, switches, voice processors, etc. The output device(s) 818 can include any type of output device, including but not limited to audio, video, other visual indicators, etc. The modem 820 can be any device configured to allow exchange of data to and from a network 824. The network 824 can be any type of network, including but not limited to a wired or wireless network, a private or public network, a local area network (LAN), a wireless local area network (WLAN), a wide area network (WAN), a BLUETOOTH™ network, and the Internet. The modem 820 can be configured to support any type of communications protocol desired. The processor 802 may also be configured to access the display controller(s) 822 over the system bus 810 to control information sent to one or more displays 826. The display(s) 826 can include any type of display, including but not limited to a cathode ray tube (CRT), a liquid crystal display (LCD), a plasma display, etc.

The processor-based system 800 in FIG. 8 may include a set of instructions 828 to be executed by the processor 802 for any application desired according to the instructions. The instructions 828 may be stored in the system memory 808, processor 802, and/or instruction cache 804 as examples of non-transitory computer-readable medium 830. The instructions 828 may also reside, completely or at least partially, within the system memory 808 and/or within the processor 802 during their execution. The instructions 828 may further be transmitted or received over the network 824 via the modem 820, such that the network 824 includes the computer-readable medium 830.

While the computer-readable medium 830 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

Figure 9:
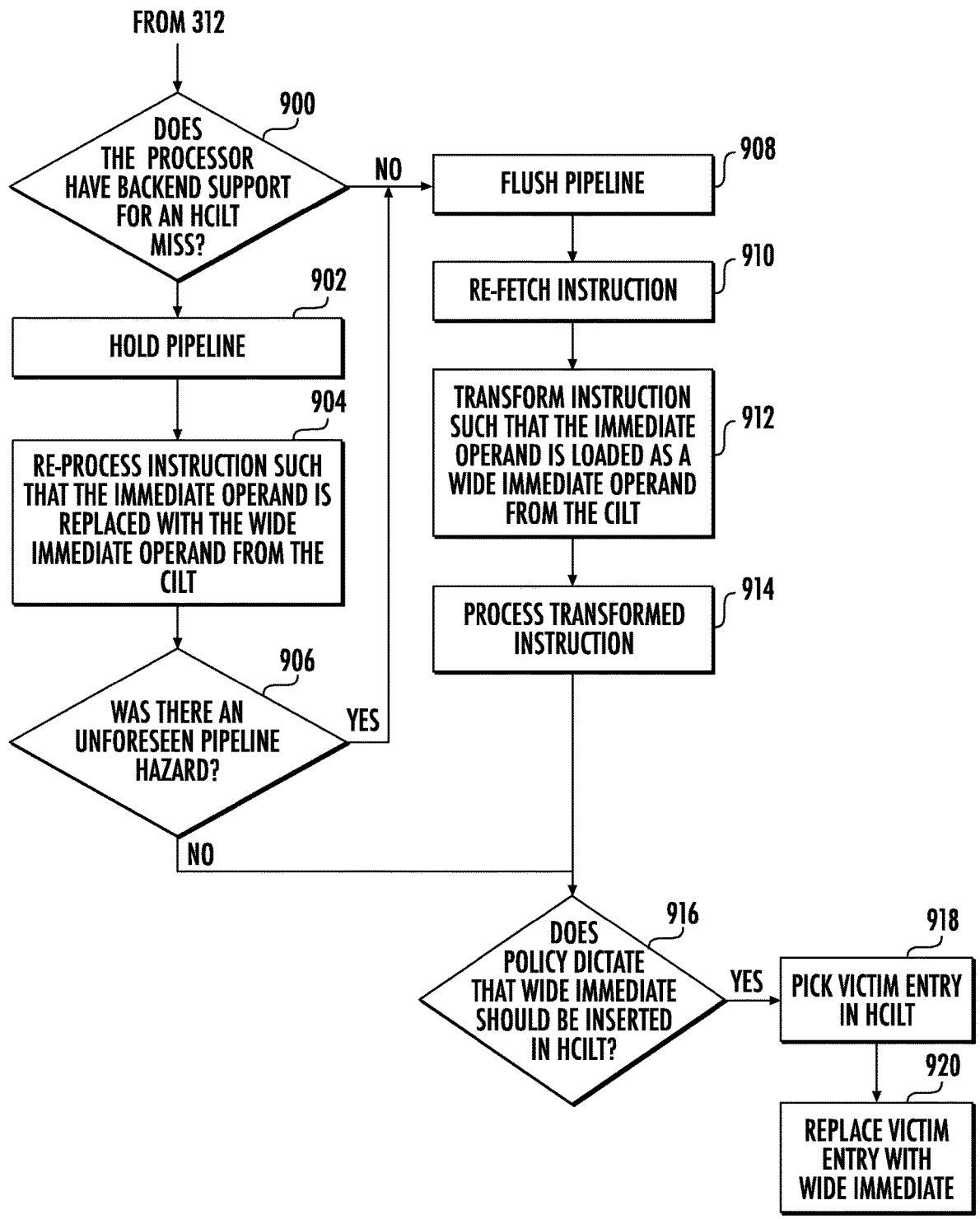
FIG. 9 is a flowchart illustrating an exemplary process for handling an HCILT miss wherein a wide immediate operand is not found in an HCILT.

FIG. 9 is a flowchart illustrating details regarding what can happen if a wide_immediate operand is not found in the HCILT 226 (i.e., an HCILT miss) according to one embodiment of the present disclosure. The process begins at block 312 of the process discussed above with respect to FIG. 3, where the wide immediate operand is not found in the HCILT 226 (the NO path from block 312 in FIG. 3). If the wide_immediate operand is not found in the HCILT 226, a determination is made whether the processor element 104 has backend support for an HCILT miss (block 900). As discussed herein, backend support for an HCILT miss means that a pipeline (or the part of the pipeline currently executing the instruction having the immediate operand) can be blocked while an instruction to load the immediate operand from the CILT is injected directly into the backend and then processed without a flush of the pipeline. If the processor element 104 does have backend support for an HCILT miss, the pipeline is held (block 902) and the instruction is re-processed such that the immediate operand is replaced with the wide immediate operand from the CILT (block 904). A determination is then made if there has been an unforeseen hazard in the pipeline (block 906). This may occur, for example, if the instruction where the immediate operand is replaced with the wide immediate operand from the CILT cannot obtain an execution resource even with the pipeline held, there is a translation fault, etc.) If there has been an unforeseen hazard in the pipeline, the pipeline is flushed (block 908), the instruction is re-fetched (block 910), the instruction is transformed such that the immediate operand is loaded as a wide_immediate operand from the CILT (block 912), and the transformed instruction is processed (block 914). Notably, the case in which an unforeseen hazard occurs results in a pipeline flush, which increases overhead of processing the instruction having the immediate operand.

If there was not an unforeseen pipeline hazard (i.e., if re-processing of the instruction such that the immediate operand is replaced with the wide_immediate operand from the CILT proceeds without issue after the pipeline is held), a determination is made whether a policy dictates that the wide_immediate operand should be inserted in the HCILT (block 916). As part of the support for processing wide_immediate operands discussed herein, the processor-based system 100 may include a policy for determining when wide_immediate operands that were not found in the HCILT 226 should be copied from the CILT into the HCILT 226. Notably, this is only an issue when the size of the HCILT 226 is smaller than a number of entries in the CILT. In such a case, policy rules such as a certain number of HCILT misses for a wide_immediate operand, a frequency of HCILT misses, or any number of different events may dictate that a wide_immediate operand be added to the HCILT 226. If the policy dictates that the wide_immediate operand should be inserted in the HCILT 226, a victim entry in the HCILT 226 is chosen (block 918), and the victim entry is replaced with the wide_immediate operand (block 920). The victim entry may similarly be chosen by any number of policy rules, such as frequency of use, for example.

Moving back to block 900, if the processor element 104 does not have backend support for an HCILT miss, meaning that the instruction cannot be re-processed such that the immediate operand is replaced with the wide_immediate operand from the CILT without interrupting the pipeline, the pipeline is flushed (block 908), the instruction is re-fetched (block 910) and transformed such that the immediate operand is replaced with the wide_immediate operand from the CILT (block 912), and the transformed instruction is processed (block 914). Once again, the process can proceed to block 916, where a determination is made whether the wide_immediate should be added to the HCILT 226 and can be added or not added based thereon.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality.

How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor-based system, comprising:
  a processing element configured to:
    fetch one or more instructions associated with a program binary from an instruction memory, the one or more instructions comprising an instruction having an immediate operand;
    determine that the immediate operand is a reference to a wide_immediate operand; and
    in response to determining that the immediate operand is a reference to a wide immediate operand:
      determine whether the processing element includes a hardware common intermediate lookup table (HCILT); and
      in response to determining the processing element does not include an HCILT:
        retrieve the wide_immediate operand from a common intermediate lookup table (CILT) in the program binary wherein the immediate operand indexes the wide_immediate operand in the CILT; and
        process the instruction having the immediate operand such that the immediate operand is replaced with the wide_immediate operand from CILT.

2. The processor-based system of claim 1, wherein the processing element is further configured to:
  determine that the immediate operand is not a reference to a wide_immediate operand; and
  in response to determining that the immediate operand is not a reference to a wide immediate operand, process the instruction having the immediate operand.

3. The processor-based system of claim 1, wherein the processing element is further configured to determine that the immediate operand is a reference to a wide_immediate operand by being configured to determine if a reserved bit of the immediate operand is set.

4. The processor-based system of claim 1, wherein the processing element is further configured to determine that the immediate operand is a reference to a wide_immediate operand by being configured to examine an opcode of the instruction having the immediate operand.

5. The processor-based system of claim 1, wherein a wide_immediate operand comprises an immediate operand that is larger than a maximum immediate length permitted by an instruction set architecture (ISA) of the processor.

6. A processor-based system, comprising:
  a processing element comprising:
    hardware common intermediate lookup table (HCILT) circuitry comprising a register configured to store a table indexing immediate values to wide immediate values; and
    instruction processing circuitry configured to:
      fetch one or more instructions associated with a program binary from an instruction memory, the one or more instructions comprising an instruction having an immediate operand;
      determine that the immediate operand is a reference to a wide_immediate operand; and
      in response to determining that the immediate operand is a reference to a wide_immediate operand:

determine whether the processing element includes an HCILT; and
in response to determining the processing element includes an HCILT:
search the HCILT for the wide_immediate operand indexed by the immediate operand; and
in response to finding the wide_immediate operand indexed by the immediate operand in the HCILT, process the instruction such that the immediate operand is replaced with the wide_immediate operand from the HCILT.

7. The processor-based system of claim 6, wherein the processing element is further configured to, in response to failing to find the wide_immediate operand indexed by the immediate operand in the HCILT:
retrieve the wide_immediate operand from a common intermediate lookup table (CILT) in the program binary wherein the immediate operand indexes the wide_immediate operand in the CILT; and
process the instruction having the immediate operand such that the immediate operand is replaced with the wide_immediate operand from the CILT.

8. The processor-based system of claim 7, wherein the processing element is further configured to, in response to failing to find the wide_immediate operand indexed by the immediate operand in the HCILT, write the wide_immediate operand retrieved from the CILT to the HCILT.

9. The processor-based system of claim 6 wherein the processing element is further configured to:
determine that the immediate operand is not a reference to a wide_immediate operand; and
in response to determining that the immediate operand is not a reference to a wide immediate operand, process the instruction having the immediate operand.

10. The processor-based system of claim 6 wherein:
the program binary contains a common intermediate lookup table (CILT), which is a table indexing immediate values to wide intermediate values; and
the processing element is further configured to write a number of entries in the CILT into the HCILT in response to a context switch of the program binary.

11. The processor-based system of claim 6 wherein the processing element is further configured to determine that the immediate operand is a reference to a wide_immediate operand by being configured to determine if a reserved bit of the immediate operand is set.

12. The processor-based system of claim 6 wherein the processing element is further configured to determine that the immediate operand is a reference to a wide_immediate operand by being configured to examine an opcode of the instruction having the immediate operand.

13. The processor-based system of claim 6 wherein a wide_immediate operand comprises an immediate operand that is larger than a maximum immediate length permitted by an instruction set architecture (ISA) of the processor.

14. A method for operating a processor element in a processor-based system, comprising:
fetching one or more instructions associated with a program binary from an instruction memory, the one or more instructions comprising an instruction having an immediate operand;
determining that the immediate operand is a reference to a wide_immediate operand;
in response to determining that the immediate operand is a reference to a wide operand, determining that the processor element includes a hardware common intermediate lookup table (HCILT);
in response to determining that the processor element includes an HCILT, searching the HCILT for the wide_immediate operand indexed by the immediate operand; and
in response to finding the wide_immediate operand indexed by the immediate operand in the HCILT, processing the instruction such that the immediate operand is replaced with the wide_immediate operand from the HCILT.

15. The method of claim 14 further comprising:
determining that the processor element does not include an HCILT; and
in response to determining that the processor element does not include an HCILT:
retrieving the wide_immediate operand from a common intermediate lookup table (CILT) in the program binary wherein the immediate operand indexes the wide_immediate operand in the CILT; and
processing the instruction such that the immediate operand is replaced with the wide_immediate operand from the CILT.

16. The method of claim 14 further comprising, in response to failing to find the wide_immediate operand indexed by the immediate operand in the HCILT:
retrieving the wide_immediate operand from a common intermediate lookup table (CILT) in the program binary wherein the immediate operand indexes the wide_immediate operand in the CILT; and
processing the instruction such that the immediate operand is replaced with the wide immediate operand from the CILT.

17. The method of claim 16 further comprising, in response to failing to find the wide_immediate operand indexed by the immediate operand in the HCILT, writing the wide immediate operand retrieved from the CILT to the HCILT.

18. The method of claim 14 wherein:
the program binary contains a common intermediate lookup table (CILT), which is a table indexing immediate values to wide intermediate values; and
the method further comprises writing a number of entries in the CILT into the HCILT in response to a context switch of the program binary.

19. The method of claim 14 further comprising:
determining that the immediate operand is not a reference to a wide_immediate operand; and
in response to determining that the immediate operand is not a reference to a wide immediate operand, processing the instruction having the immediate operand.

20. The method of claim 14 wherein a wide_immediate operand comprises an immediate operand that is larger than a maximum immediate length permitted by an instruction set architecture (ISA) of the processor.

* * * * *